US008806926B2

(12) United States Patent
Boisseleau et al.

(10) Patent No.: US 8,806,926 B2
(45) Date of Patent: Aug. 19, 2014

(54) DEVICE FOR MULTIPOINT ACQUISITION/DISTRIBUTION OF FLUID, IN PARTICULAR PROBE FOR TAPPING PRESSURE IN A TURBOMACHINE AIR INLET

(75) Inventors: Denis Boisseleau, Artigueloutan (FR); Jean-Baptiste Arilla, Pau (FR); Pierre Biscay, Lons (FR)

(73) Assignee: Turbomeca, Bordes (FR)

( * ) Notice: Subject to any disclaimer, the term of this patent is extended or adjusted under 35 U.S.C. 154(b) by 0 days.

(21) Appl. No.: 13/697,914

(22) PCT Filed: May 24, 2011

(86) PCT No.: PCT/FR2011/051171
§ 371 (c)(1),
(2), (4) Date: Nov. 14, 2012

(87) PCT Pub. No.: WO2011/148094
PCT Pub. Date: Dec. 1, 2011

(65) Prior Publication Data
US 2013/0061964 A1 Mar. 14, 2013

(30) Foreign Application Priority Data
May 25, 2010 (FR) ...................................... 10 54003

(51) Int. Cl.
*G01M 15/04* (2006.01)
*G01P 13/02* (2006.01)

(52) U.S. Cl.
USPC ..................................... 73/114.31; 73/861.65

(58) Field of Classification Search
USPC ........................................................ 73/114.31
See application file for complete search history.

(56) References Cited

U.S. PATENT DOCUMENTS 3,646,811 A * 3/1972 DeLeo et al. .................... 73/182
4,096,744 A * 6/1978 De Leo et al. .................. 73/180
4,522,070 A   6/1985 Hagen
4,981,038 A   1/1991 Torres et al.
5,046,360 A   9/1991 Hedberg
5,442,958 A * 8/1995 Hagen ........................ 73/170.02
6,038,932 A   3/2000 Wandel et al.

FOREIGN PATENT DOCUMENTS

| DE | 2 036 044 | 1/1972 |
| DE | 196 40 606 | 9/1997 |
| EP | 2 039 978 | 3/2009 |
| GB | 2 231 667 | 11/1990 |
| WO | 85 01578 | 4/1985 |
| WO | 91 09274 | 6/1991 |
| WO | 2006 092375 | 9/2006 |

OTHER PUBLICATIONS

International Search Report Issued Jul. 19, 2011 in PCT/FR11/51171 Filed May 24, 2011.

* cited by examiner

*Primary Examiner* — Freddie Kirkland, III
(74) *Attorney, Agent, or Firm* — Oblon, Spivak, McClelland, Maier & Neustadt, L.L.P.

(57) ABSTRACT

To achieve accurate and rapid acquisition or distribution of fluid—at multipoints—with good spatial resolution and minimal bulk, a twisted arrangement of ducts is provided in the acquisition/distribution zone making it possible to perform several acquisitions/distributions over several heights with one and the same device. The device is a pressure probe in which a probe body exhibits a first part or section for acquiring pressure forming a cylinder less than 6 mm in diameter. The probe exhibits internal ducts forming parallel helicoidal traces on the section and channels formed in a metal alloy body between the ducts and inlet orifices. The number of internal ducts is advantageously equal to nine, including three orifices being disposed over three different heights of the probe body.

13 Claims, 2 Drawing Sheets

Figures 1, 2:
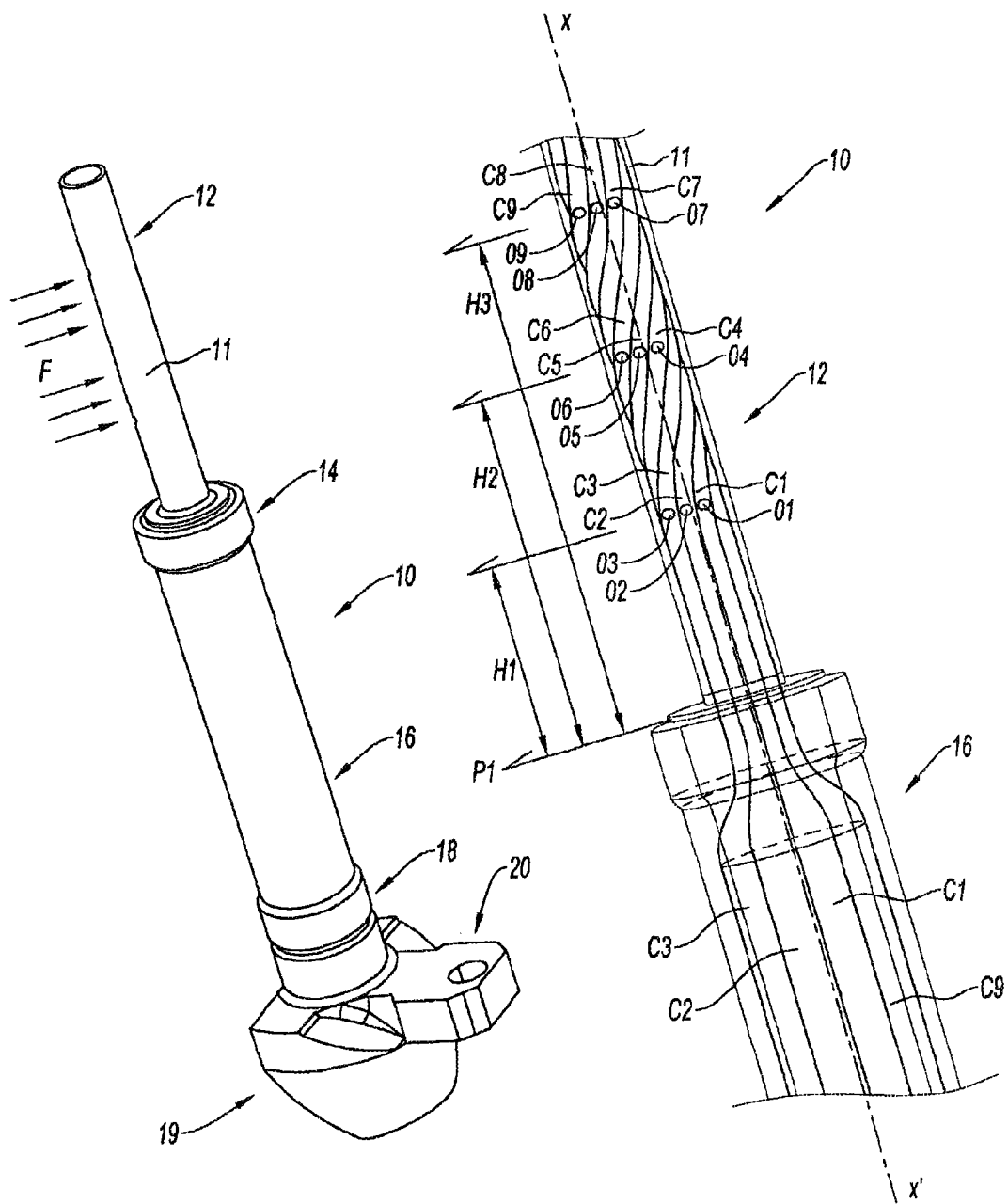

DEVICE FOR MULTIPOINT ACQUISITION/DISTRIBUTION OF FLUID, IN PARTICULAR PROBE FOR TAPPING PRESSURE IN A TURBOMACHINE AIR INLET

The invention concerns a device for multipoint acquisition or distribution of fluid, in particular a probe for pressure tapping in an air inlet of a turbomachine, for example a helicopter engine.

To understand and minimize the installation losses in an aircraft, various parameters are measured at air inlet and engine exhaust during flight tests. As regards the air inlet, the important two parameters to make a gyration measurement are the total pressure and the flow angle. In every flight circumstances, these measurements must be quickly carried out, within a few seconds, for reasons of feasibility and cost.

The invention concerns notably the detection of the parameter values of total pressure and flow angle of the air at the aircraft engine inlet. More generally, the invention relates to the multipoint acquisition, as in the case of probes, or fluid multipoint distribution, e.g.: for systems for injecting fluid in a duct or lubricating mechanical parts). In any case, the invention applies to parts requiring multipoint fluid inlets/outlets.

In the field of parameter value acquisition, currently used probes comprise three sensors which allow the carrying out of three measurements at the same height so as to obtain a sufficient angular coverage. Such probes have been described, for example, in U.S. Pat. No. 5,233,865. Such probes supply values of the mean static pressure as well as pressure characteristics of a turbulent air flow.

In practice, three probes of this type are used with a rotating system in order to acquire a number of measurements appropriate for making an evaluation of total pressure and flow direction. Alternatively, groups of three fixed probes can also be used.

Now simultaneous and quick acquisition measurements require fixed and small size probes so that the air flow should not be disrupted and the obstruction should be minimized in front of the compressor.

And yet the type of probe described above does not allow to acquire an accurate gyration measurement at air inlet of an engine in a state of flight. As a matter of fact, such an acquisition presupposes:
- a detailed cartography of the measurements: current probes give an insufficient number of measurements/number of probes ratio;
- a negligible disruption of the compressor operation: these probes cause too much obstruction and too important a wake;
- a sufficiently short test time: the known probes have a long response time and require scanning of each azimuthal position;
- a representative airframe test: the probe rotation system would challenge the airframe integration of the engine and thus the representativeness of the test.

In a general manner, the invention aims at achieving an acquisition or a distribution of fluid—at multipoints—which is accurate, rapid and distinctly distributed, with a good spatial resolution for a given angular coverage. To this end, the invention provides a twisted arrangement of ducts allowing to carry out several acquisitions/distributions at several heights using a one and only device.

In particular, concerning an acquisition of gyration measurement in flight, the invention aims at obtaining a compactness limiting the bulk, a sufficient number of measurement points so as to map the air flow without bringing the probes into rotation, an arrangement upstream from the compressor without altering the environment, an acquisition of the measurements within a short period of time—e.g. within thirty seconds—, without deteriorating the engine operation—notably by keeping a good mechanical behaviour with respect to vibrations—during the test campaign.

More precisely, the present invention concerns a device for multipoint acquisition/distribution of fluid comprising at least two internal ducts which are arranged in a body and follow helicoidal traces in a section having the same axis as the one of the body. Several acquisitions/distributions of fluid can be carried out in this section by propagation from inlet/outlet orifices formed on a skin of the body in several parallel planes. The position of the orifices and the pitch of the ducts are determined so that at least one orifice corresponds to a one and only internal duct.

Thus, it appears that for the same front bulk and the same angular coverage, the twisted configuration of several ducts (three ducts in an elementary example) allows to achieve measurements (two measurements in an elementary example) distributed on a maximized number of parallel planes (three planes in this example). Because the helicoidal trace allows to make one duct vanish and to add helically another duct between two planes of acquisition, while a solution with rectilinear ducts having the same front bulk and the same coverage, facing the same measurement field, can use only a lower number of ducts (for example, two ducts in identical conditions) and allows then the same number of measurements (two in the example) only in a lower number of planes (here, one single plane).

Besides, the appropriate number of ducts can be determined according to the technological constraints (angular coverage of the measurements in a same plane, diameter of the ducts, diameter and length of the device body, etc.) and/or according to certain priorities (e.g. by prioritizing the number of measurements per acquisition plane or the number of acquisition planes).

Moreover, the parallel acquisition/distribution planes can be either at an angle to the body axis of the device or perpendicular to this axis.

According to particular embodiments:
- the internal ducts have an oblong-shaped section in order to maximize the volume dedicated to ducts with respect to the volume of the probe in the acquisition/distribution section;
- the probe body is cylindrical and the internal ducts have a section in the form of flower petals distributed circularly inside the probe section, each petal having a widened transverse part and a tapered part directed in a centripetal way towards the axis of this body;
- the acquisition/distribution transfer between ducts and orifices is provided by transverse channels.

The invention also relates to the use of such a device, chosen among an air inlet probe for measuring gyration in a turbomachine compressor, an injector of liquid or gas into a vein and a part lubricator.

In particular, when used as a probe, the device can present the following advantageous characteristics:
- the probe body presents a first part or section for acquiring pressure forming a cylinder of less than 6 mm in diameter, preferably substantially 5 to 5.5 mm;
- ducts and channels are formed by selective melting on a bed of powder during the manufacture of the body from metal alloy powder;
- the number of internal ducts is equal to nine, three orifices are arranged at three different heights;

the ducts for transferring pressure acquisition consist, at each height of acquisition, of a central duct arranged between two side ducts, the side ducts presenting an angular shift of 35 to 45°, preferably substantially 40°, with regard to the central duct; such an angular magnitude allows to best encompass the gyration in laminar state through the side ducts while the total pressure tapping is provided by the central ducts.

In these conditions, the number of simultaneous measurements per probe is substantially increased—for example by a factor three with regard to the previous probes—, the distribution of the measurement heights can be adapted to all engine casings, and the decrease of the pressure drop in the ducts offers a substantially shorter time for obtaining the measurement.

Figure 3:
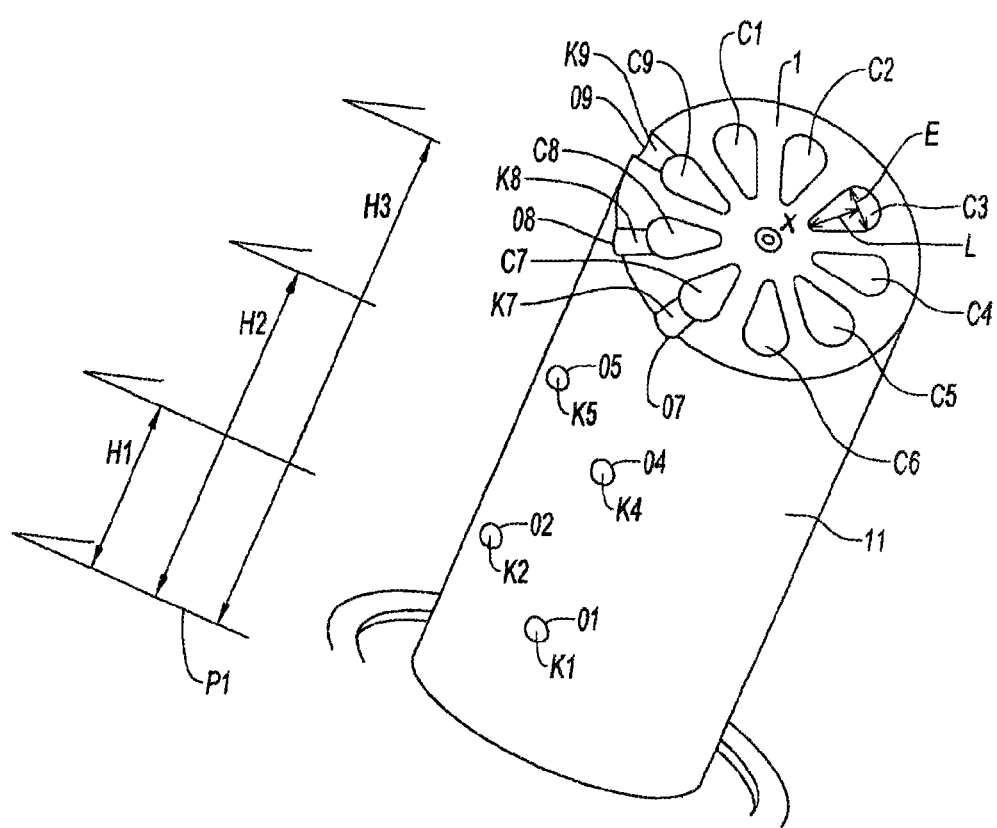

Other characteristics and advantages of the present invention will appear when reading the detailed exemplary embodiment which follows, referring to the appended Figs. which respectively represent:

FIG. 1, a perspective view of an example of a probe according to the invention to be mounted upstream from a turbomachine compressor;

FIG. 2, a transparent part view of said probe showing, in particular, nine internal ducts with a helicoidal development in the detection zone, and FIG. 3, a perspective part view of the probe, which was cross-sectioned at the level of a detection plane, showing the petal shape of the cross-sectioned ducts as well as the corresponding inlet orifices.

Referring to FIG. 1, a machined probe 10 for measuring gyration of a turbomachine compressor according to the invention comprises a first cylindrical part 12, of lower diameter—equal to 5 mm in the example—, extending as a shoulder 14 on a second cylindrical part 16 of wider diameter, approximately 14 mm in the illustrated example. This second part 16 itself extends as a shoulder 18 on a base 19 presenting a machined support 20 for fixing the probe.

The first part 12 constitutes a cylindrical section defining a zone of pressure acquisition: it has circular measuring inlet orifices—formed in the external skin 11 of this first cylindrical part. The transparent view of FIG. 2 shows the internal structure of probe 10. Orifices O1 to O9 are aligned on three detection planes at different heights, marked out with regard to plane P1 connecting the parts 12 and 14, respectively: O1, O2 and O3 at height H1; O4, O5 and O6 at height H2; as well as O7, O8 and O9 at height H3.

Orifices O1 to O9 are positioned facing internal ducts, respectively C1 to C9. The ducts form parallel helicoidal curves in between planes of heights H1 and H3, so that the position of the ducts turns through one third revolution between two successive heights. At the tip, the measuring ducts are sealed. The second part 16 constitutes the part for transmitting to measurement means, the ducts being then away from the central axis X'X of the probe 10 while remaining parallel to said axis. As a matter of fact, this part 16 lies outside the pressure acquisition zone and the bulk is no determining factor any more.

The sectional view of FIG. 3 illustrates more accurately, at the level of the section plane which is at height H3, the petal shape of ducts C1 to C9 formed in the body 1, and channels K7 to K9 that provide the transfer of pressure acquisition from orifices O7 to O9 formed in the skin 11 of body 1, and the corresponding ducts, respectively C7 to C9.

At the level of the detection plane which is at height H2, only orifices O4 and O5 onto which channel K4 and K5 open are to be seen. Similarly, orifices O1 and O2 formed in the body 1 in order to allow channels K1 and K2 to open onto the outside are to be seen at the level of the plane which is at height H1.

The tapered part "L" of the petals formed by ducts C1 to C9 is radially directed, in a centripetal way, towards the axis X'X of the probe. The widened part "E" of these petals into which channel K1 to K9 run, thus situated at the farthest from axis X'X, has a width of about 0.6 mm while the channels have a diameter of the order of 0.4 mm. The orientation and the dimensions of the petals allow to best use the cylindrical space dedicated to the ducts and reduced as much as possible to avoid the disruptions due to the presence of a probe upstream from a compressor.

At the leading edge of the probe, ducts consist at each level H1 to H3—as well as orifices and corresponding connection channels—of a central duct (orifice and channel), C8 (O8 and K8) in the Fig., arranged between two side ducts (orifices and channels), C7 and C9 (O7 and O9, K7 and K9). Side ducts, orifices or channels advantageously present an angular shift of 35 to 45°, preferably substantially 40°—measured as the angle centred on axis X'X—with regard to the central duct, respectively orifice or central channel.

Ducts C1 to C9 are made by any possible known means. In the example, they result from a selective melting of a bed of metal powder during the manufacture of the body by melting of this powder.

During operation, the flow of inlet air F (FIG. 1) comes, upstream from the compressor, and exert a variable pressure on the leading edge of the probe and this pressure propagates into the internal ducts from the pressure transfer channels. According to the flight conditions, the pressure produces a specific tension in each one of the nine micro-piezoelectric sensors which are in contact with the end of the ducts. The measurement of gyration is made in the whole flight envelope. The intensity of the electric currents supplied by these sensors is then analyzed in a central processing unit in order to deduce from it a value of the total pressure and flow angle of the flow of inlet air.

The invention is not limited to the described and shown exemplary embodiment. It is for example possible to provide other forms for the orifices, for example adapted to the incline of the duct with a helicoidal development: an oblong, for example elliptic, shape. The probe body can also have a cylindrical shape with a circular, oblong or oval base. Besides, the number of ducts can be higher than nine. The central part of the probe, which increases in volume as the number of ducts raises, can be used to integrate other elements, e.g. temperature probes. Furthermore, the body can have various forms which are adapted to the context, forms with a longitudinal or curved axis; and ducts are not necessarily parallel to each other.

The invention claimed is:

1. A device for multipoint acquisition/distribution of fluid, comprising:
   at least two internal ducts arranged in a body,
   wherein the ducts follow helicoidal traces in an acquisition/distribution section, being coaxial with an axis of the body, in which acquisitions/distributions of fluid are carried out by propagation from inlet/outlet orifices formed on a skin of the body in a plurality of parallel planes,
   wherein a position of the orifices and a pitch of the at least two ducts being determined so that at least one orifice corresponds to only one internal duct of the at least two internal ducts.

2. The device for multipoint acquisition/distribution according to claim 1, wherein the at least two internal ducts have an oblong-shaped section in order to maximize a volume dedicated to the at least two internal ducts with respect to a volume of the device in the acquisition/distribution section.

3. The device for multipoint acquisition/distribution according to claim 1, wherein the body is cylindrical and the at least two internal ducts have a section shaped like flower petals distributed circularly within the section, each petal having a widened transverse part and a tapered part directed in a centripetal way towards the axis of the body.

4. The device for multipoint acquisition/distribution according to claim 1, wherein acquisition/distribution transfer between ducts and orifices is provided by transverse channels.

5. The device for multipoint acquisition/distribution according to claim 1, wherein a quantity of inlet/outlet orifices ranges for any intermediate height distribution from all of the orifices disposed at a single height to a single orifice at each different height by way of adapting the pitch of the at least two ducts to each height.

6. The device for multipoint acquisition/distribution according to claim 1, wherein the device is an air inlet probe for measuring gyration in a turbomachine compressor, an injector for injecting liquid or gas into a vein, or a mechanical part lubricator.

7. The device for multipoint acquisition/distribution according to claim 6, wherein the device is a probe in which a probe body presents a first part or section for acquiring pressure forming a cylinder of less than 6 mm in diameter.

8. The device for multipoint acquisition/distribution according to claim 7, wherein the diameter of the cylinder is substantially 5 to 5.5 mm.

9. The device for multipoint acquisition/distribution according to claim 7, wherein the at least two ducts are made by selective melting during manufacture of the body from metal alloy powder.

10. The device for multipoint acquisition/distribution according to claim 7, wherein the device includes nine internal ducts and three orifices arranged at three different heights.

11. The device for multipoint acquisition/distribution according to claim 10, wherein the ducts for transferring pressure acquisition consist at each height of acquisition of a central duct arranged between two side ducts, the side ducts presenting an angular shift of 35 to 45° with regard to the central duct.

12. The device for multipoint acquisition/distribution according to claim 11, wherein the angular shift of the side ducts is substantially 40°.

13. A probe, comprising:
a body having an acquisition/distribution section;
a plurality of internal ducts arranged in the body, the internal ducts following helicoidal traces in the acquisition/distribution section; and
a plurality of inlet/outlet orifices on a skin of the body, the orifices extending to respective internal ducts and being located in a plurality of parallel planes,
wherein acquisitions/distributions of fluid are carried out by propagation from the orifices.

* * * * *